United States Patent
Takeda et al.

(10) Patent No.: US 11,920,935 B2
(45) Date of Patent: Mar. 5, 2024

(54) NAVIGATION DEVICE, AUTOMATIC DRIVING CONTROL DEVICE, AND NAVIGATION METHOD

(71) Applicants: Nissan Motor Co., Ltd., Kanagawa (JP); RENAULT S.A.S., Boulogne-Billancourt (FR)

(72) Inventors: Wataru Takeda, Kanagawa (JP); Junichi Hatayama, Kanagawa (JP); Tetsuya Ito, Kanagawa (JP); Katsumi Ohashi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 199 days.

(21) Appl. No.: 17/595,896

(22) PCT Filed: May 28, 2019

(86) PCT No.: PCT/IB2019/000606
§ 371 (c)(1),
(2) Date: Nov. 29, 2021

(87) PCT Pub. No.: WO2020/240243
PCT Pub. Date: Dec. 3, 2020

(65) Prior Publication Data
US 2022/0236064 A1    Jul. 28, 2022

(51) Int. Cl.
*G01C 21/30* (2006.01)
*B60W 60/00* (2020.01)
(52) U.S. Cl.
CPC .......... *G01C 21/30* (2013.01); *B60W 60/001* (2020.02); *B60W 2556/40* (2020.02)
(58) Field of Classification Search
CPC .......... B60W 2556/50; B60W 30/182; B60W 50/14; B60W 30/12; B60W 60/005;
(Continued)

(56) References Cited

U.S. PATENT DOCUMENTS 6,466,866 B1 * 10/2002 Sato ................. G01C 21/34
                                                          73/178 R
11,168,993 B1 * 11/2021 Tsoupko-Sitnikov ................
                                                          G01C 21/3407
(Continued)

FOREIGN PATENT DOCUMENTS

CA         3059862 A1    10/2018
JP     2000-266560 A      9/2000
(Continued)

*Primary Examiner* — Abby Y Lin
*Assistant Examiner* — Dylan M Katz
(74) *Attorney, Agent, or Firm* — Osha Bergman Watanabe & Burton LLP

(57) ABSTRACT

A navigation device includes an own vehicle position detecting unit configured to detect position information of own vehicle; a route setting unit configured to set a guidance route that guides the own vehicle to a destination on the basis of a first map including information of a traveling route and the position information of the own vehicle; a matching unit configured to match a position of the own vehicle as a first own position with the traveling route where the own vehicle travels on the first map on the basis of the position information of the own vehicle; a driving lane detecting unit configured to match the position of the own vehicle as a second own position with a driving lane where the own vehicle travels on a second map on the basis of the second map including information of the driving lane in the traveling route and the position information of the own vehicle; and a calculating unit configured to determine whether the second own position is included in the first own position. When the guidance route is set, the matching unit matches the first own position on the guidance route, and when the second own position is no longer included in the first own position thereafter, the matching unit matches the first own position on the first map on the basis of the position information.

13 Claims, 9 Drawing Sheets

(58) Field of Classification Search
CPC . B60W 2050/0072; B60W 2050/0096; B60W 60/001; B60W 2556/40; G01C 21/34; G01C 21/30; G01C 21/26; G01C 21/3658; G05D 1/0274; G05D 1/0088
See application file for complete search history.

(56) References Cited

U.S. PATENT DOCUMENTS

| | | | |
|---|---|---|---|
| 2007/0021912 A1* | 1/2007 | Morita | G01C 21/3602 |
| | | | 701/431 |
| 2015/0338222 A1* | 11/2015 | Okada | G01C 21/30 |
| | | | 701/409 |
| 2019/0033465 A1 | 1/2019 | Kido et al. | |
| 2019/0382009 A1* | 12/2019 | Iwasa | G08G 1/0969 |
| 2020/0256681 A1* | 8/2020 | Kim | G01C 21/3881 |

FOREIGN PATENT DOCUMENTS

| | | |
|---|---|---|
| JP | 2004-177364 A | 6/2004 |
| JP | 2018-044833 A | 3/2018 |
| WO | 2018/109516 A1 | 6/2018 |

\* cited by examiner

NAVIGATION DEVICE, AUTOMATIC DRIVING CONTROL DEVICE, AND NAVIGATION METHOD

TECHNICAL FIELD

The present invention relates to a navigation device, an automatic driving control device, and a navigation method.

BACKGROUND ART

A navigation device is configured to match a position of own vehicle on a map, display a mark indicative of the position of own vehicle on the map, set a guidance route tracing a traveling route of an optimal combination connecting to a destination through an input of the destination, and display it on the map (see WO/2018/109516).

SUMMARY OF INVENTION

However, for example, in a case where own vehicle passes through a branch point between one traveling route designated as the guidance route and another traveling route not designated as the guidance route, when own vehicle enters the other traveling route, there was a case where the navigation device was not able to quickly re-match the position of own vehicle on the map according to the traveling route where own vehicle actually travels.

Therefore, an object of the present invention is to provide a navigation device, an automatic driving control device, and a navigation method that can quickly re-match a position of own vehicle on a map according to a traveling route where own vehicle actually travels.

A navigation device according to one embodiment of the present invention is a navigation device comprising: own vehicle position detecting means configured to detect position information of own vehicle; route setting means configured to set a guidance route that guides the own vehicle to a destination on the basis of a first map including information of a traveling route and the position information of the own vehicle; matching means configured to match a position of the own vehicle as a first own position with the traveling route where the own vehicle travels on the first map on the basis of the position information of the own vehicle; driving lane detecting means configured to match the position of the own vehicle as a second own position with a driving lane where the own vehicle travels on a second map on the basis of the second map including information of the driving lane in the traveling route and the position information of the own vehicle; and determining means configured to determine whether the second own position is included in the first own position, wherein when the guidance route is set, the matching means matches the first own position on the guidance route, and when the second own position is no longer included in the first own position thereafter, the matching means matches the first own position on the first map on the basis of the position information.

DESCRIPTION OF EMBODIMENTS

Basic Configuration of this Embodiment

Figure 1:
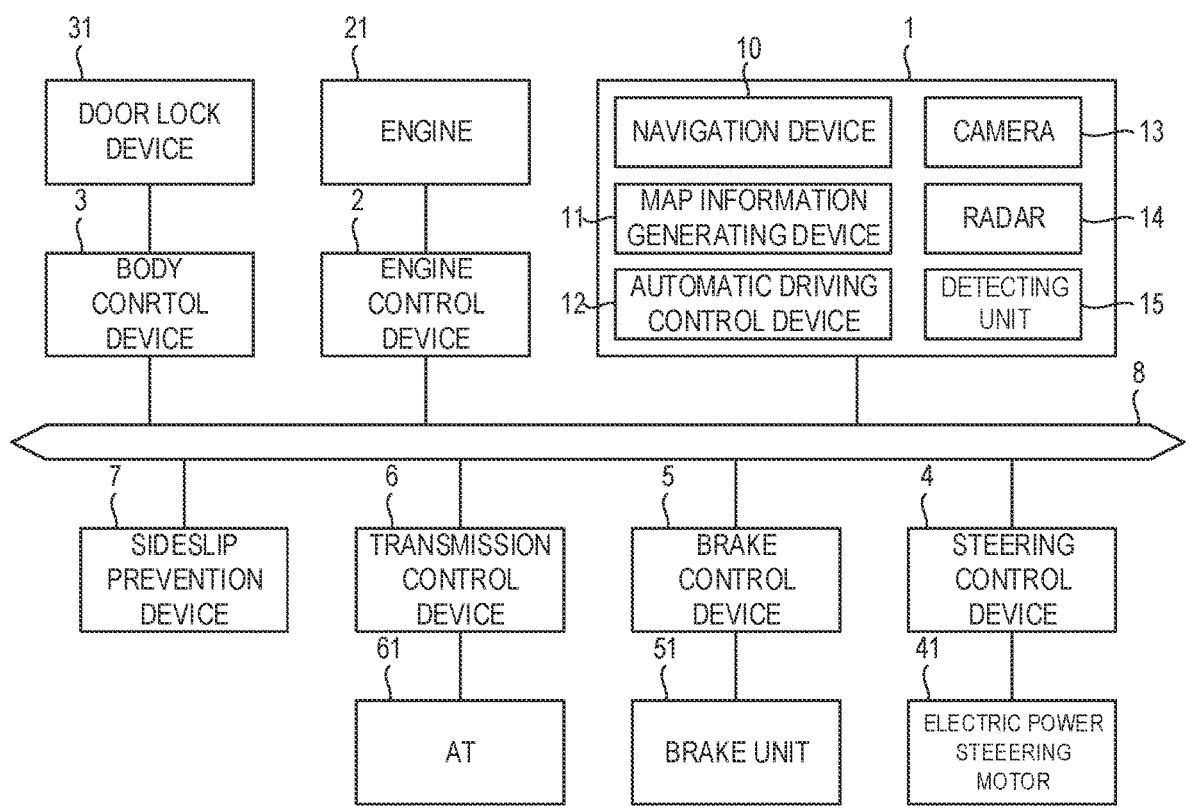
FIG. 1 is a block diagram of a vehicle on which a navigation device of this embodiment is mounted.

Hereinafter, embodiments of the present invention will be described on the basis of the drawings. FIG. 1 is a block diagram illustrating a configuration of a vehicle to which an automatic driving assistance system 1 according to one embodiment of the present invention is mounted. The automatic driving assistance system 1 according to the embodiment is configured to perform automatic driving control of the vehicle following a guidance route 91 (see FIG. 5 and the like) to a destination generated by a navigation device 10.

As described later, automatic driving of the vehicle of this embodiment starts control in accordance with an input by a driver and travels the vehicle following the guidance route 91 even when the driver does not perform an accelerator operation, a brake operation, or a handle operation. Note that in a case where the driver performs the accelerator operation, the brake operation, or the handle operation during the automatic driving control, the automatic driving control is stopped or is temporarily halted to prioritize the various operations by the driver.

The vehicle of this embodiment includes an automatic driving assistance system 1, an engine control device 2 (Engine Control Module: ECM), a body control device 3 (Body Control Module: BCM), a steering control device 4, a brake control device 5, a transmission control device 6 (Transmission Control Module: TCM), a sideslip prevention device 7 (Vehicle Dynamics Control: VDC), and the like. The automatic driving assistance system 1 includes the navigation device 10, a map information generating device 11, and an automatic driving control device 12.

Here, the navigation device 10, the map information generating device 11, the automatic driving control device 12, the engine control device 2, the body control device 3, the steering control device 4, the brake control device 5, the transmission control device 6, the sideslip prevention device 7, and the like are communicatively connected via a Controller Area Network (CAN) bus 8 as an on-board LAN.

The engine control device 2 is a controller that performs operation control of an engine 21. The engine control device 2 controls the engine 21 to achieve a request driving power output from the automatic driving control device 12, the sideslip prevention device 7, or the like. It should be noted that, while the vehicle that includes only the engine 21 (internal combustion engine) as a traveling driving source has been given as an example, the vehicle may be substituted by an electric vehicle (including a fuel cell vehicle) that includes only an electric motor as a traveling driving source, a hybrid vehicle that includes a combination of the engine 21 and the electric motor as a traveling driving source, and the like.

In addition to lock/unlock of a door by a door lock device 31, the body control device 3 controls various functions, such as a keyless function, such as passive keyless and remote control keyless, an engine start function, such as push engine start, a security function, such as an immobilizer, a timer function, such as a room lamp and a battery saver, and a safety function, such as a tire pressure monitoring system.

The steering control device 4 is a controller that controls an electronic power steering motor 41. The steering control device 4 controls the electronic power steering motor 41 to achieve a target steering angle output from the automatic driving control device 12 or the like. The electronic power steering motor 41 is a steering actuator mounted to a column shaft (not illustrated) of a steering.

The brake control device 5 is a controller that controls a brake unit 51. The brake control device 5 controls the brake unit 51 to achieve a request braking force output from the automatic driving control device 12, the sideslip prevention device 7, or the like.

The transmission control device 6 is a controller that controls an automatic transmission (AT) 61. The transmission control device 6 operates an optimal gear from a vehicle speed, an accelerator position (accelerator opening degree), a shift position, and the like and performs shift control of the AT 61 to achieve a request driving power output from the automatic driving control device 12, the sideslip prevention device 7, or the like.

Aiming to reduce a sideslip of the vehicle, the sideslip prevention device 7 monitors driving operations by a driver and movements of the vehicle using various sensors, outputs the request driving power to the engine control device 2 according to the traveling state of the vehicle, and outputs the request braking force to the brake control device 5.

The navigation device 10, the map information generating device 11, and the automatic driving control device 12 are an integrated circuit, such as a microprocessor, and include an A/D converter circuit, a D/A converter circuit, a Central Processing Unit (CPU), a Read Only Memory (ROM), a Read Access Memory (RAM), and the like. These may be integrated into one integrated circuit or may be separately configured.

The navigation device 10 includes a map (SD map 102, FIG. 2) that covers information of various kinds of traveling routes where the vehicle travels, generates the guidance route 91 (see FIG. 5 and the like) that connects the current position of own vehicle and the destination, and displays it on the map. Additionally, the navigation device 10 matches the position of own vehicle on the map (SD map 102) as a first own position and displays a mark 92 (see FIG. 5) indicative of the first own position on the map.

A camera 13 is installed at, for example, a vehicle front portion, a vehicle side portion, and a vehicle rear portion and outputs image data in which, for example, the front side of the vehicle, the side of the vehicle, and the rear of the vehicle are taken to the map information generating device 11 and the automatic driving control device 12. A radar 14 is installed at, for example, the vehicle front portion, the vehicle side portion, and the vehicle rear portion and outputs a polar coordinate (a distance and a position) of a reflection point of an object present at, for example, the front side of the vehicle, the side of the vehicle, and the rear of the vehicle to the automatic driving control device 12. A detecting unit 15 (own vehicle position detecting means) is various sensors, such as a GPS receiver, a gyro sensor, an accelerator sensor, a vehicle speed sensor, and a direction sensor used to, for example, detect the position of own vehicle.

The map information generating device 11 generates automatic driving map information, which is used for automatic driving control, on the basis of the guidance route 91 generated by the navigation device 10 and outputs it to the automatic driving control device 12.

The automatic driving control device 12 calculates the request driving power, the request braking force, and the target steering angle such that own vehicle travels following the guidance route 91 generated by the navigation device 10. The automatic driving control device 12 outputs the calculated request driving power to the engine control device 2 and the transmission control device 6 through the CAN bus 8, outputs the calculated request braking force to the brake control device 5 through the CAN bus 8, and outputs the calculated target steering angle to the steering control device 4 through the CAN bus 8.

Figure 2:
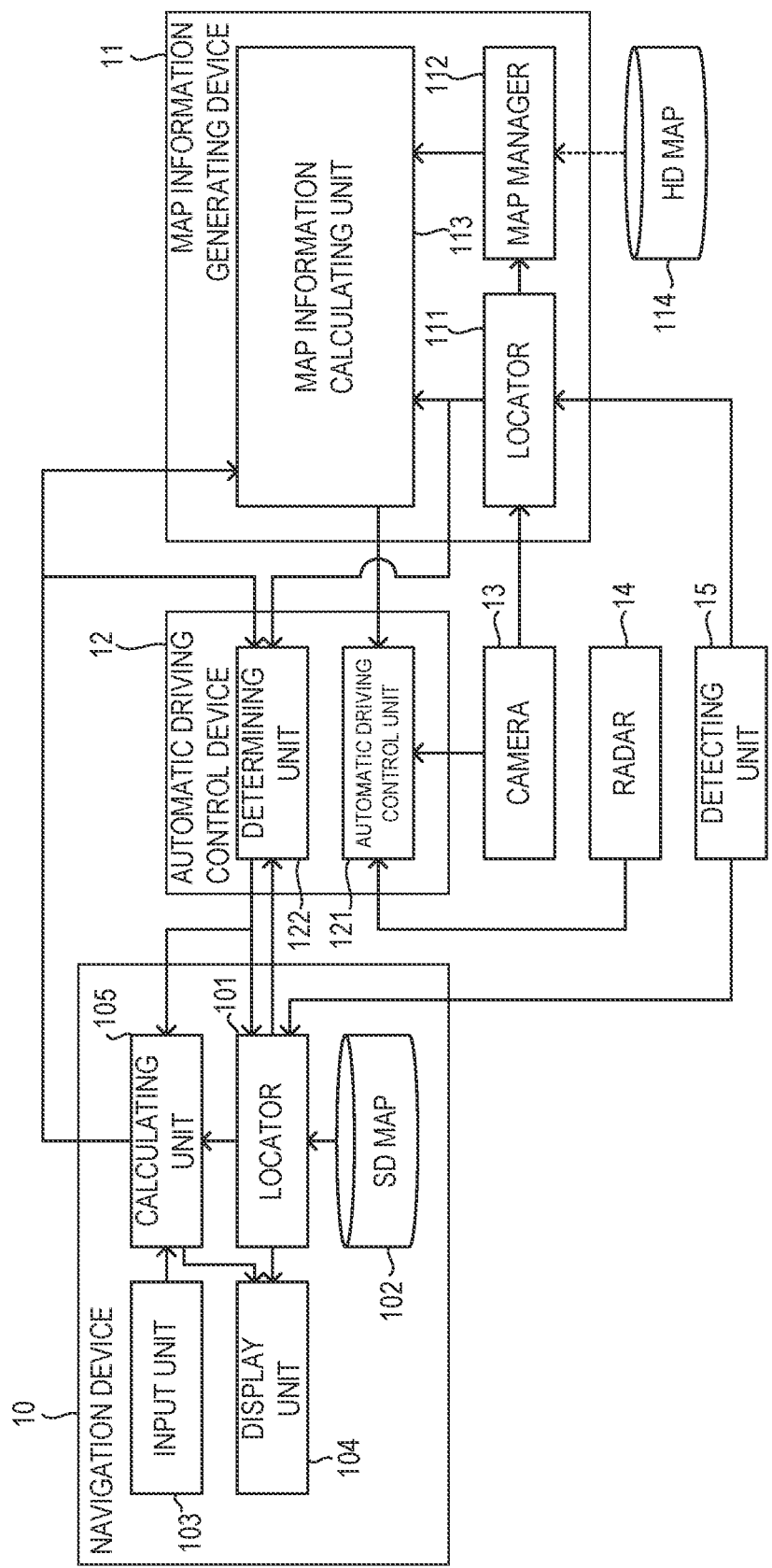
FIG. 2 is a block diagram of the navigation device, a map information generating device, and an automatic driving control device.

FIG. 2 is a block diagram of the navigation device 10, the map information generating device 11, and the automatic driving control device 12.

The navigation device 10 includes a locator 101 (matching means), the SD map 102 (first map), an input unit 103, a display unit 104, and a calculating unit 105 (route setting means, reliability calculating means). The locator 101 matches the position of own vehicle with the traveling route on the SD map 102 on the basis of a signal from the detecting unit 15 (vehicle speed sensor, the direction sensor, the GPS receiver, or the like) as the first own position and displays the mark 92 (see FIG. 5 and the like) indicative of the first own position in the display unit 104.

The SD map 102 is a map including information of various traveling routes where own vehicle can travel and a part (or all) of the SD map 102 is displayed in the display unit 104. The locator 101 reads a part (or all) of the SD map 102 such that the matched first own position (mark 92) is arranged at the center (or at the lowest portion) of a screen of the display unit 104 and outputs it to the display unit 104. The locator 101 outputs information of the first own position to a determining unit 122 described later. It should be noted that the SD map 102 may be mounted to the navigation device 10, but may be configured to be downloaded from a server.

When the information of the destination is input from the input unit 103, the calculating unit 105 generates the guidance route 91 connecting the current location and the destination in the SD map 102 on the basis of the SD map 102 input to the locator 101, and displays it in the display unit 104. The calculating unit 105 outputs the information of the guidance route 91 to a map information calculating unit 113 (and the determining unit 122) described later.

The guidance route 91 is a traveling route (a road) displayed on the map (SD map 102), which is formed by connecting a plurality of the traveling routes (for example, the shortest route) through which own vehicle goes from the current location until reaching the destination, in one line. Accordingly, the display unit 104 displays the map representing a road (traveling route) around own vehicle and displays the guidance route 91 to the destination and the mark 92 indicative of the position of own vehicle (first own position) on the map.

Although details will be described later, the calculating unit 105 calculates a matching reliability of the traveling route on the guidance route 91 and the traveling route branched from the traveling route. Additionally, with the guidance route 91 set, the calculating unit 105 performs an operation that adds a predetermined value to the matching reliability regarding the traveling route of the guidance route 91. Furthermore, when an unmatched signal is input from the determining unit 122, the calculating unit 105 performs an operation that directly subtracts the predetermined value added to the matching reliability.

More generally, when the guidance route 91 is set, the calculating unit 105 can set a value higher than a value in a case where the guidance route 91 is not set to the matching reliability regarding the guidance route 91. After that, when the unmatched signal is input from the determining unit 122, the calculating unit 105 sets the matching reliability regarding the guidance route 91 to the matching reliability before setting the guidance route 91.

The map information generating device 11 includes a locator 111, a map manager 112, and the map information calculating unit 113.

An HD map 114 (second map) is, for example, a highly accurate map that shares at least a part of the information of the traveling route covered by the SD map 102, includes information of driving lanes (lanes) in the traveling route, and is stored in the server. The traveling route covered by the HD map 114 targets a limited-access road, such as a highway, and some of ordinary roads, but may target the traveling routes in the range same as those of the SD map 102.

The locator 111 detects (identifies) the traveling route on the HD map 114 and the driving lane (lane) in the traveling route from the signal from the detecting unit 15 and further the image data output from the camera 13 and matches the position of own vehicle on the HD map 114 as a second own position. Here, the second own position includes information of the traveling route where own vehicle travels and information of the driving lane where own vehicle travels in the traveling route.

The map manager 112 downloads highly accurate map information of the traveling route and the driving lane from the second own position (current own vehicle position) to a destination at a predetermined distance ahead (for example, 7 km) from the second own position matched by the locator 111 (or the information of the traveling route and the driving lane detected (identified) by the locator 111) from the HD map 114. It should be noted that, the HD map 114 may be included in the map information generating device 11 (own vehicle).

The map information calculating unit 113 generates the automatic driving map information for automatic driving of own vehicle in the predetermined distance (for example, 7 km) from the current own vehicle position on the basis of the information of the guidance route 91 input from the navigation device 10, the highly accurate map information input from the map manager 112, and the second own position matched by the locator 111.

The automatic driving control device 12 includes an automatic driving control unit 121 and the determining unit 122. The automatic driving control unit 121 processes the image data output from the camera 13 and the information of the reflection point output from the radar 14, recognizes an object, such as another vehicle around own vehicle, and also recognizes a white line on the road, a curb, a branch point, and the like. While avoiding the recognized object, the automatic driving control unit 121 refers to the second own position (current own vehicle position) matched by the locator 111 and the automatic driving map information, calculates the request driving power, the request braking force, and the target steering angle, and outputs them to the CAN bus 8 as described above.

The determining unit 122 compares the information of the first own position input from the locator 101 with the second own position input from the locator 111, and determines whether the second own position is included in the first own position. When the second own position is included, the determining unit 122 outputs a match signal to the locator 101, and when the second own position is no longer included, the determining unit 122 outputs the unmatched signal to the locator 101.

It should be noted that, when the locator 111 determines that the position of own vehicle is outside the range of the HD map 114, the map manager 112 or the map information calculating unit 113 does not operate, and the automatic driving control device 12 does not operate.

The locator 101 constantly detects the position of own vehicle by the signal from the detecting unit 15. When the guidance route 91 is generated, as described later, with the condition of the input of the match signal from the determining unit 122, the locator 101 matches the first own position (a virtual position of own vehicle) on the SD map 102 and displays the mark 92 indicative of the first own position on the guidance route 91. In this case, for example, the locator 101 matches the first own position at the position on the guidance route 91 shortest from the detected position of own vehicle by the detecting unit 15 and displays the mark 92 indicative of the first own position.

Here, position accuracy (position resolution) by the locator 101, that is, position accuracy of the first own position depends on a resolution of the SD map 102 (a dimension of a map element at the minimum unit constituting the SD map 102), and the resolution is, for example, around positioning resolution of the GPS. Accordingly, the first own position in the SD map 102 is defined not as a point but, for example, as any position in a predetermined region around the center of the traveling route where own vehicle travels. Here, for example, the predetermined region is equivalent to a circle and a rectangle (or a band expanding in the width direction) having a dimension dependent on the resolution of the SD map 102, or the like.

On the other hand, position accuracy (position resolution) by the locator 111, that is, position accuracy of the second own position depends on a resolution of the HD map 114 (a dimension of a map element at the minimum unit constituting the HD map 114), and the resolution is, for example, around a width of the driving lane. Accordingly, the second own position in the HD map 114 is defined as not a point but, for example, any position in a predetermined region around the center of the driving lane where own vehicle travels. Here, for example, the predetermined region is equivalent to a circle and a rectangle (or a band expanding in the width direction) having a dimension dependent on the resolution of the HD map 114, or the like.

Figure 8:
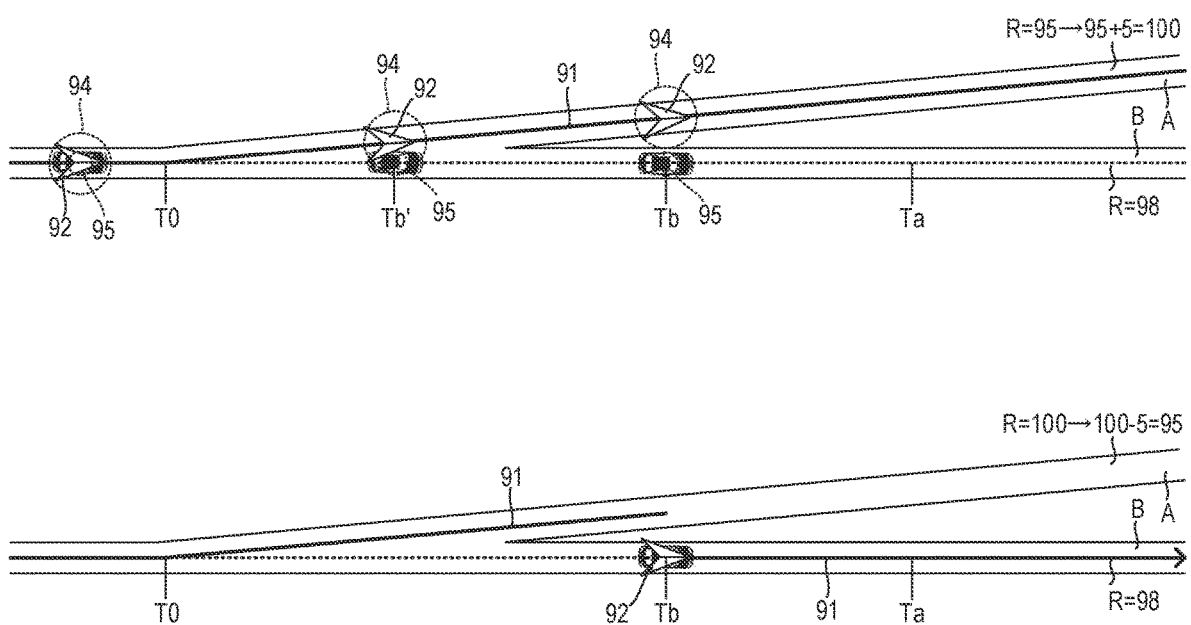
FIG. 8 is a drawing illustrating a case where the navigation device of this embodiment matches the position of own vehicle on the map and own vehicle travels without following the guidance route (first).

Accordingly, the determining unit 122 performs, for example, control that outputs the match signal to the locator 101 when the circle (rectangle) indicative of the second own position overlaps with the circle (rectangle) indicative of the first own position and outputs the unmatched signal to the locator 101 when the circle (rectangle) indicative of the second own position does not overlap with the circle (rectangle) indicative of the first own position (see FIG. 8). It should be noted that, the locator 111 and the locator 101 may be established by common hardware to ensure calculations in alternation.

In the automatic driving control device 12, as long as the determining unit 122 outputs the match signal, the automatic driving of own vehicle can be performed by selection by the driver, and the automatic driving is canceled by the drive operation by the driver or the like.

When the branch point is present in the guidance route 91 and the branch angle is small, there may be a case where the position of own vehicle is matched with another traveling route, not one traveling route where own vehicle actually travels, and the above-described automatic driving becomes difficult. Accordingly, in this embodiment, the matching of the position of own vehicle can be reliably performed through the application of the matching reliability (plus the predetermined value) as follows.

Control Sequence of this Embodiment

Figure 3:
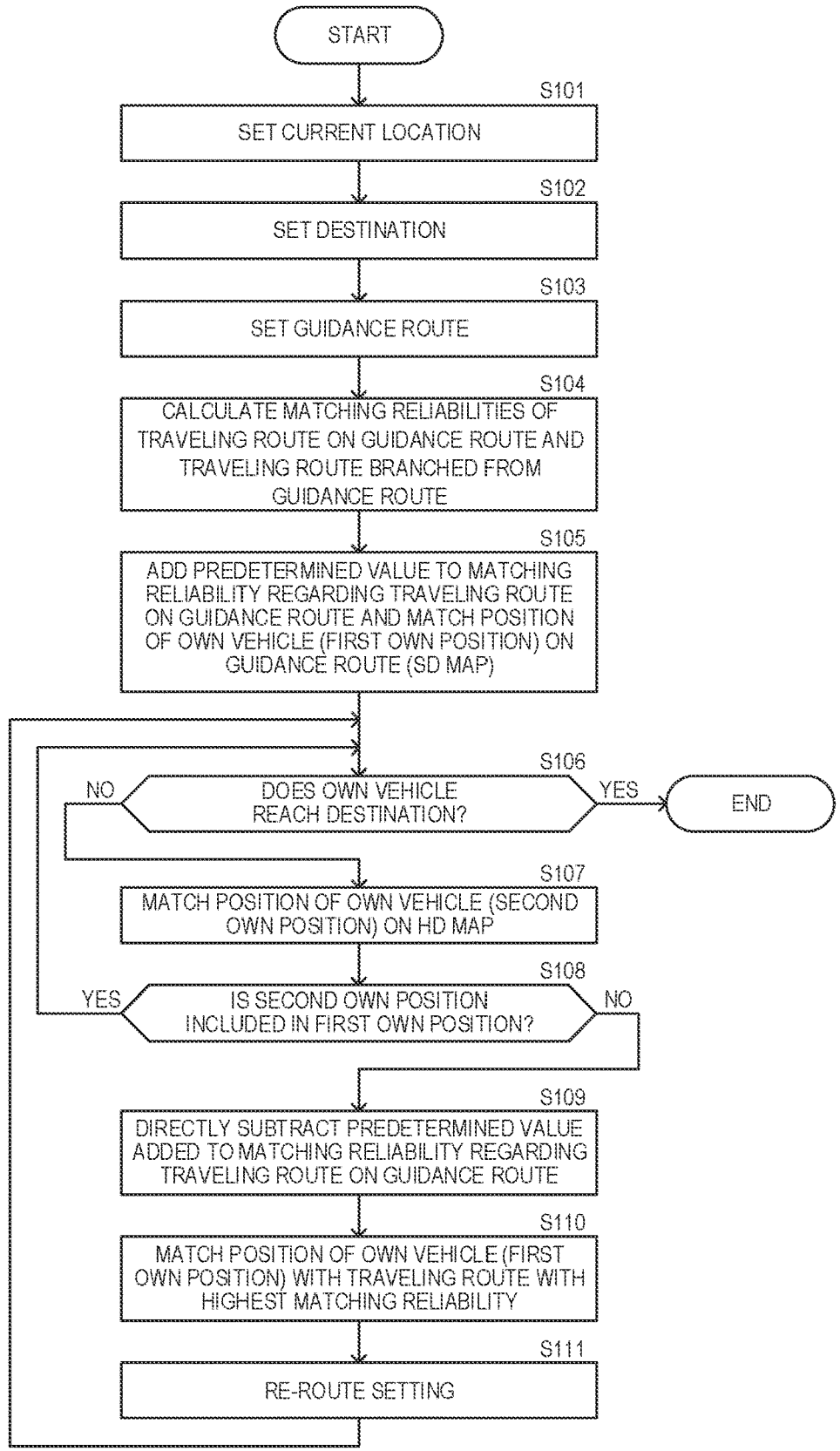
FIG. 3 is a control sequence diagram of the navigation device.

With reference to FIG. 3, the control sequence of the navigation device 10 will be described. Here, the description will be given assuming that the traveling route where own vehicle travels is, for example, a highway, the traveling route to the destination is covered by not only the SD map 102 but also the HD map 114, and the traveling route (including the driving lane) where own vehicle travels and the traveling route (including the driving lane) branched from the traveling route can be detected (identified) with the HD map 114.

At Step S101, the locator 101 matches the position of own vehicle on the traveling route in the SD map 102 as the first own position on the basis of the signal from the detecting unit 15 (detection of the position by the detecting unit 15=own vehicle position detecting step) and displays the mark 92 indicative of the first own position in the display unit 104.

At Step S102, when information of the destination is input from the input unit 103, the calculating unit 105 sets the destination on the SD map 102. At Step S103, the calculating unit 105 sets the guidance route 91 connecting from the current location to the destination (route setting step).

At Step S104, the calculating unit 105 calculates the matching reliability of a traveling route A (see FIG. 5 and the like) on the guidance route 91 and a traveling route B (see FIG. 5 and the like) that is branched from the traveling route. The matching reliability is defined as a value indicative of probability that own vehicle travels the traveling route for at least one of the traveling routes. Here, the matching reliability is calculated as an index of a possibility of traveling of the respective traveling routes of the traveling route A on the guidance route 91 and the traveling route B branched from the traveling route A. The matching reliability is used as the index to estimate the traveling route where own vehicle travels until the locator 101 (or the locator 111) can determine whether own vehicle travels any of the traveling route A and the traveling route B using the signal from the detecting unit 15 or the like. The matching reliability is calculated from a trajectory of the traveling route where own vehicle has traveled up to the present, the vehicle speed, a steering angle, an angle of the branch at the branch point of the two traveling routes, a distance between the two traveling routes, and the like.

For example, when the traveling route A with the matching reliability of 100% is present, it is determined that own vehicle reliably enters the traveling route A from the branch point, the first own position is matched with the traveling route A on the SD map 102 when own vehicle enters the traveling route A from the branch point, and the mark 92 indicative of the first own position is displayed to reliably enter the traveling route A on the SD map 102. On the other hand, when the traveling route B with the matching reliability of 0% is present, it is determined that own vehicle does not enter the traveling route B, the first own position is not matched with the traveling route B on the SD map 102 when own vehicle travels the objective traveling route A from the branch point, and the mark 92 indicative of the first own position is not displayed on the traveling route B on the SD map 102.

For example, in a case where the traveling route B, which is branched from the traveling route A on the guidance route 91, is approximately orthogonal to the traveling route A, since the locator 101 can almost reliably discriminate the traveling route A from the traveling route B, the matching reliability of the traveling route A becomes a value extremely close to 100%, and the matching reliability of the traveling route B becomes a value close to 0%. In this case as well, when own vehicle travels the traveling route A, the first own position is almost reliably matched with the traveling route A on the SD map 102, and the mark 92 indicative of the first own position is almost reliably displayed on the traveling route A on the SD map 102. In this case, a predetermined value described later does not need to be added to the matching reliability.

On the other hand, due to the shape of the branch point and the like, there may be a case where the matching reliabilities of the traveling route A on the guidance route 91 and the traveling route B branched from the guidance route 91 are close to one another. This possibly occurs when the angle formed by the traveling route A on the guidance route 91 and the traveling route B is narrow, and a state in which the traveling route A and the traveling route B are close to one another continues long even after own vehicle passes through the branch point.

Furthermore, there may be a case where the matching reliability of the traveling route B is higher than the matching reliability of the traveling route A. In this case, even when own vehicle enters the traveling route A after passing the branch point, a possibility that the first own position is matched with the traveling route B on the SD map 102 becomes higher than a possibility that the first own position is matched with the traveling route A.

Therefore, at Step S105, the calculating unit 105 adds the predetermined value to the matching reliability regarding the traveling route A on the guidance route 91 to ensure matching with the traveling route A on the guidance route 91 (matching step). Here, the predetermined value (high value) can be any value (for example, 5%, see FIG. 6) with which the matching reliability (for example, the initial value is 95%, see FIG. 6) of the traveling route on the guidance route 91 becomes 100% or more. This allows the locator 101 to reliably and quickly match the first own position with the traveling route A on the SD map 102 with no condition, that is, without a comparison with the matching reliability of the traveling route B.

At Step S106, the locator 101 (may be another configuration member of the navigation device 10, such as the calculating unit 105) determines whether the first own position (the position of own vehicle) matches the position of the destination, that is, whether own vehicle reaches the destination. When it is determined as YES, the navigation ends, and when it is determined as NO, the process transitions to the next Step S107.

At Step S107, the locator 111 refers to the signal from the detecting unit 15 and the image data from the camera 13 and matches the position of the driving lane in the traveling route where own vehicle travels as the second own position on the HD map 114 (driving lane detecting step).

At Step S108, the determining unit 122 determines whether the second own position matched by the locator 111 is included in (overlapped with) the first own position matched by the locator 101 (determining step). When it is determined as YES (determined that own vehicle travels the traveling route A), the process returns to Step S106, and when it is determined as NO (determined that own vehicle travels the traveling route B), the process transitions to Step S109. Here, the case where the second own position is not included in the first own position (guidance route 91) includes a case where own vehicle goes out of the guidance route 91 by the drive operation by the driver and the like.

At Step S109, the determining unit 122 outputs the unmatched signal to the locator 101 and the calculating unit 105. When the unmatched signal is input, the calculating unit 105 subtracts the predetermined value added to the matching reliability regarding the traveling route A on the guidance route 91 (see FIG. 8).

At Step S110, the locator 101 matches the position of own vehicle with the traveling route B with the highest matching reliability (for example, 98%, see FIG. 8) on the SD map 102 as the first own position (matching step). Accordingly, the display of the mark 92 indicative of the first own position switches from on the traveling route A (for example, 95%, see FIG. 8) to on the traveling route B. At this time, the calculating unit 105 may add the predetermined value to the matching reliability regarding the traveling route B, which has become the new guidance route 91.

At Step S111, the locator 101 performs re-route setting to update the guidance route 91 from the current own vehicle position to the destination and the process returns to Step S106. Thus, the locator 101 matches the position of own vehicle as the first own position on the guidance route 91 after update and displays the first own position with the mark 92.

It should be noted that, as described above, the calculating unit 105 can output the information of the guidance route 91 to the determining unit 122, and the locator 111 can output the information of the driving lane in the traveling route where own vehicle travels to the determining unit 122. Accordingly, at Step S108, the determining unit 122 determines whether the driving lane (traveling route) detected by the locator 111 is included in the guidance route 91. It can be controlled that, when it is determined as YES (is determined that own vehicle travels the traveling route A), the process returns to Step S106, and when it is determined as NO (determined that own vehicle does not travel the traveling route A), the process transitions to Step S109.

The predetermined value can be any value (for example, 4.5%) such that the matching reliability (for example, the initial value is 95%) of the traveling route A on the guidance route 91 becomes higher than at least the matching reliability (for example, as 98%) of the traveling route B branched from the traveling route A. Accordingly, at Step S105, the locator 101 can compare the matching reliability (for example, 99.5%) of the traveling route A with the matching reliability (for example, 98%) of the traveling route B, select the traveling route A with the higher matching reliability, and reliably match the first own position on the SD map 102. Furthermore, at Step S109, the calculating unit 105 can set the matching reliability (high value) regarding the guidance route 91 to the matching reliability (a value lower than the high value) before the setting of the guidance route 91.

[Control Sequence of Automatic Driving Device]

Figure 4:
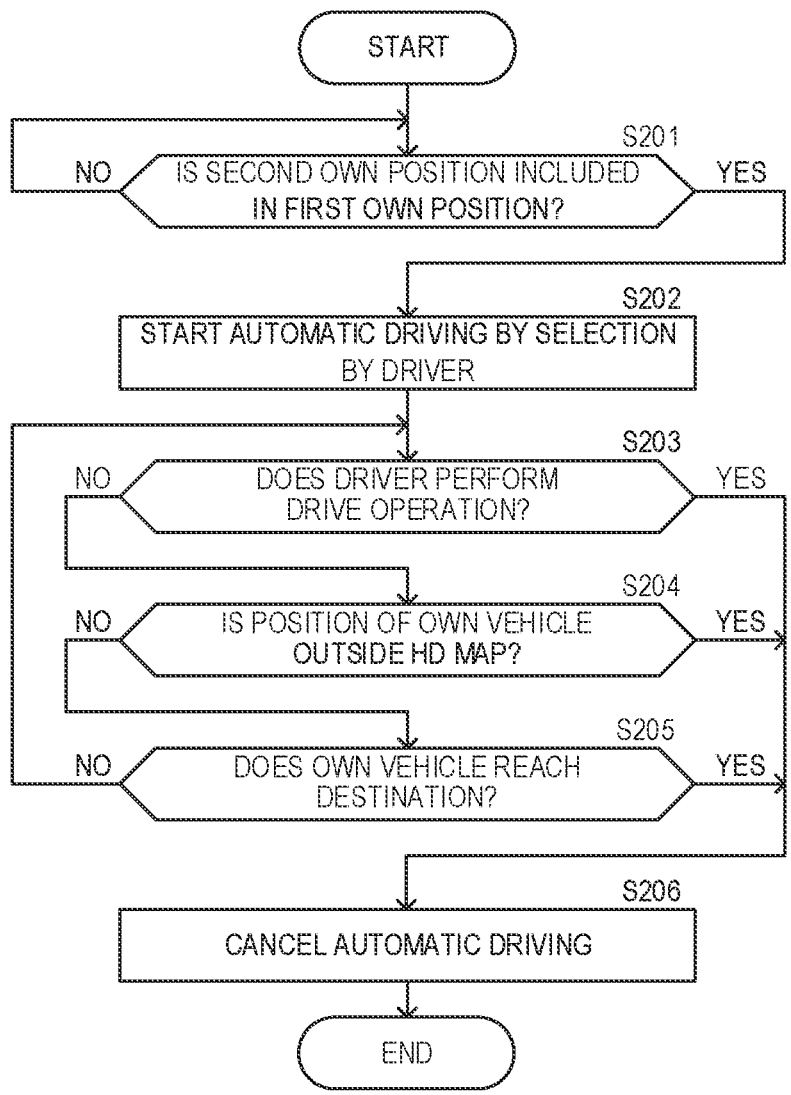
FIG. 4 is a control sequence diagram of an automatic driving control device.

FIG. 4 is the control sequence diagram of the automatic driving control device. The control sequence regarding on/off of the automatic driving control will be described. At Step S201, the automatic driving control unit 121 (automatic driving control device 12) determines whether the determining unit 122 outputs the match signal, that is, whether the second own position matched by the locator 111 is included in the first own position matched by the locator 101. When it is determined as YES, the process transitions to Step S202.

At Step S202, the automatic driving control unit 121 determine that the automatic driving can be performed, and the automatic driving starts by the selection by the driver. When the driver performs the drive operation (YES at Step S203), when the second own position (the position of own vehicle) is not on the HD map 114 (YES at Step S204), or when own vehicle reaches the destination (YES at Step S205), the automatic driving control unit 121 cancels the automatic driving (Step S206). On the other hand, as long as when it is determined as NO at all of the at Step S203, Step S204, and Step S205, the automatic driving control unit 121 continues the automatic driving.

Operation of this Embodiment

Figure 5:
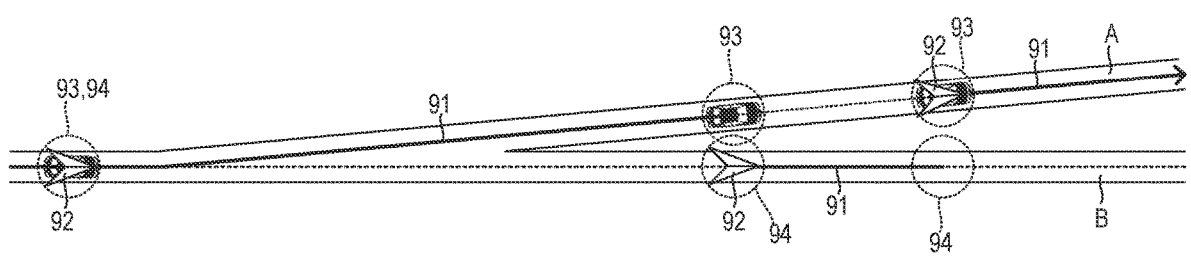
FIG. 5 is a drawing illustrating a case where a conventional navigation device matches a position of own vehicle on a map and own vehicle travels following a guidance route.
Figure 6:
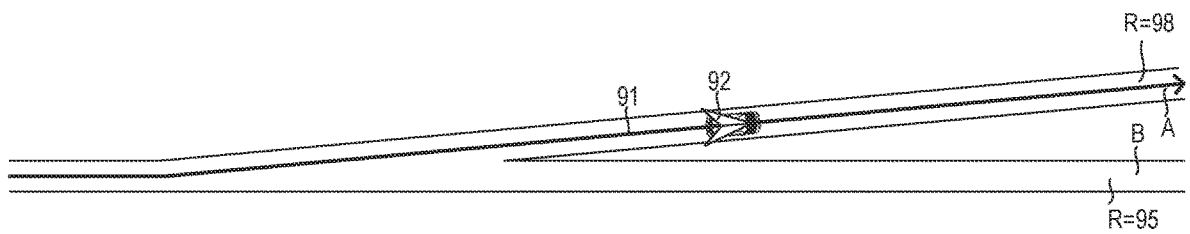
FIG. 6 is a drawing illustrating a case where the navigation device of this embodiment matches a position of own vehicle on a map and own vehicle travels following a guidance route.
Figure 6:
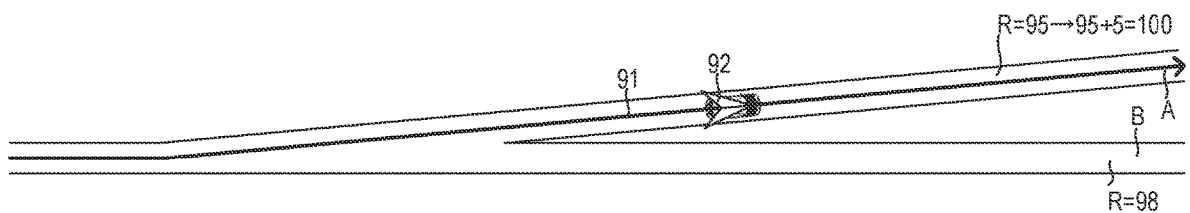

FIG. 5 is a drawing illustrating a case where a conventional navigation device matches a position of own vehicle on a map and own vehicle travels following the guidance route 91. FIG. 6 is a drawing illustrating a case where the navigation device 10 of this embodiment matches the position of own vehicle on the map and own vehicle travels following the guidance route 91.

FIG. 5 assumes a case where the guidance route 91 is set so as to enter the traveling route A from the branch point in the guidance route 91 including the branch point between the traveling route A and the traveling route B, and own vehicle actually enters the traveling route A. Here, the matching of the position of own vehicle by the locator 111 (HD map 114) or the calculation of the matching reliability by the calculating unit 105 is not considered.

As described above, the position of own vehicle is not determined by the point but is expressed by the predetermined region around the predetermined position (for example, the center in the width direction of the traveling route) considering the resolution (equivalent to a GPS positioning error) of the map (SD map 102) or the like, and is represented by, for example, a first circle 93 having a predetermined radius (may be a rectangle, the same applies to the following). Accordingly, not only the position of own vehicle but also the position (first own position) of own vehicle on the map (SD map 102) is not represented by a point, but a second circle 94 having a predetermined radius around any position (for example, the position at the center in the width direction) on the traveling route. Here, while the first circle 93 is equivalent to the measurement error range of the position of own vehicle, and the second circle 94 is equivalent to an effective matching range in which the matching of the first own position can be determined as effective, both have the same diameter. It should be noted that the mark 92 indicates the first own position as a single point at the center of the second circle 94 for convenience, but actually indicates any position at the second circle 94.

Accordingly, under the condition in which the first circle 93 (measurement error range) overlaps with the second circle 94 (effective matching range) with one another, it is difficult for the locator 101 to discriminate whether own vehicle travels the traveling route A or travels the traveling route B. Even when own vehicle actually enters the traveling route A from the branch point, the locator 101 mistakenly recognizes that own vehicle has entered the traveling route B and matches the first own position with the traveling route B in some cases. In this case, when own vehicle moves by a distance where the first circle 93 is separated from the second circle 94 without overlapping with one another, the mistaken recognition is solved for the first time and the first own position is matched with the traveling route A. When such a phenomenon occurs, the relationship between the position of own vehicle and the first own position on the map (SD map 102) becomes uncertain, and therefore the automatic driving stops.

In this embodiment, as illustrated in the upper drawing in FIG. 6, the matching reliabilities "R" of the traveling route A and the traveling route B are calculated, and the first own position is matched with the traveling route A with the highest matching reliability "R" (the matching reliability: R=98%). This allows easily matching the first own position on the map (SD map 102) with the traveling route A with the highest matching reliability from the branch point and allows avoiding the first own position to be matched with the traveling route B (the matching reliability: R=95%).

However, as illustrated in the lower drawing in FIG. 6, there may be a case where the matching reliability "R=98" of the traveling route B branched from the traveling route A is higher than the matching reliability "R=95" of the traveling route A on the guidance route 91. In this case, a possibility that the first own position is matched with the traveling route B from the branch point becomes higher than a possibility that the first own position is matched with the traveling route A.

Therefore, in this embodiment (calculating unit 105), the predetermined value (for example, "5%") is added to the matching reliability "R" regarding the traveling route A on the guidance route 91 to set such that the traveling route A on the guidance route 91 becomes the highest, that is, the matching reliability of the traveling route B branched from the traveling route A lowers. This allows the locator 101 to compare the matching reliabilities of the traveling route A and the traveling route B and easily match the first own position with the traveling route A, and the mark 92 indicative of the first own position to easily enter from the branch point to the traveling route A. Especially, as illustrated in the lower drawing in FIG. 6, by setting the matching reliability to "R=100%," the first own position can be reliably matched with the traveling route A with no condition without the comparison of the matching reliabilities between the traveling route A and the traveling route B, the mark 92 indicative of the first own position can be reliably entered from the branch point to the traveling route A, the mark 92 can be displayed on the guidance route 91 even after passing of the branch point, and the automatic driving can be continuously performed.

Figure 7:
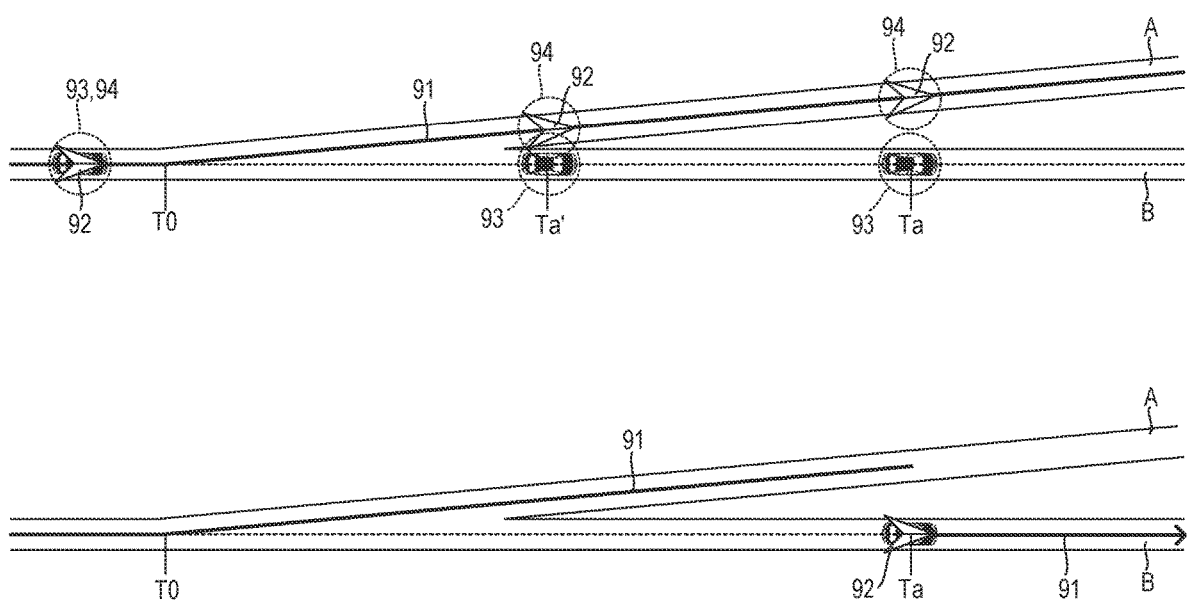
FIG. 7 is a drawing illustrating a case where the conventional navigation device matches the position of own vehicle on the map and own vehicle travels without following the guidance route.

FIG. 7 is a drawing illustrating a case where the conventional navigation device matches the position of own vehicle on the map and own vehicle travels without following the guidance route 91.

Next, assume a case where own vehicle enters the traveling route B, not the traveling route A on the guidance route 91, from the branch point by the drive operation by the driver despite that the guidance route 91 is set.

A time when own vehicle passes through the branch point is denoted as T0 and it is assumed that the automatic driving is canceled at the time by the drive operation. Additionally, it is assumed that the first circle 93 indicative of the current own vehicle position and the second circle 94 indicative of the matched first own position are concentrically disposed at T0.

As illustrated in the upper drawing in FIG. 7, when a time when the first circle 93 is separated from the second circle 94 without overlapping with one another is denoted as Ta, at the time Ta'(T0<Ta'<Ta), the first circle 93 still overlaps with the second circle 94. Accordingly, it is difficult for the locator 101 to discriminate whether own vehicle travels the traveling route A or travels the traveling route B, and there may be a case where the first own position (second circle 94) is matched with the traveling route A until immediately before the time Ta at the maximum and the traveling route A is set as the guidance route 91. As illustrated in the lower drawing in FIG. 7, since the first circle 93 is separated from the second circle 94 without overlapping with one another at and after the time Ta, the locator 101 can switch the matching position of the first own position from the traveling route A to the traveling route B and perform the re-route setting. In any case, the first own position is unstable from the time T0 until the time Ta, and therefore the automatic driving cannot be performed.

FIG. 8 is a drawing illustrating a case where the navigation device 10 of this embodiment matches the position of own vehicle on the map and own vehicle travels without following the guidance route 91 (first). As described above, in this embodiment, the first own position (the virtual position of own vehicle on the guidance route 91) matched on the SD map 102 by the locator 101 is compared with the second own position (current own vehicle position) matched on the HD map 114 by the locator 111, and whether the second own position is included in the first own position (whether the first own position includes the second own position) is determined. That is, in this embodiment, the locator 111 matches the position of own vehicle as the second own position on the HD map 114 having the resolution higher than the resolution of the SD map 102, and determines whether the second own position is included in the first own position matched by the locator 101. Accordingly, as illustrated in the upper drawing in FIG. 8, since a third circle 95 indicative of the second own position has a diameter smaller than that of the first circle 93 (measurement error range) illustrated in FIG. 7, a time until the third circle 95 is separated from the second circle 94 without overlapping with one another (Tb−T0) becomes shorter than a time until the first circle 93 is separated from the second circle 94 without overlapping with one another (Ta−T0).

As illustrated in the lower drawing in FIG. 8, in this embodiment, the determining unit 122 can output (FIG. 3, Step S108) the unmatched signal at a time Tb earlier than the time Ta. In this embodiment, when the determining unit 122 outputs the unmatched signal, a predetermined value "5%" added to the matching reliability "R" regarding the traveling route A on the guidance route 91 is directly subtracted (FIG. 3, Step S109), and the position of own vehicle is matched as the first own position on the traveling route B with the highest matching reliability (the matching reliability: R=98%) (FIG. 3, Step S110). Accordingly, as illustrated in the lower drawing in FIG. 8, the locator 101 can match the first own position with the traveling route B at the time Tb, which is before the time Ta at which the locator 101 can recognize that the matched first own position is a mistake by itself, and the calculating unit 105 can perform the re-route setting (FIG. 3, Step S111) with the first own position (the position where the mark 92 is disposed) as the base point.

Accordingly, in this embodiment, whether the second own position (third circle 95) matched on the HD map 114, which has the accuracy higher than (the resolution higher than) that of the SD map 102, is included in the first own position (second circle 94) matched on the SD map 102 is detected. This allows quick detection compared with the case where the first own position (second circle 94) matched on the SD map 102 is included in the current own vehicle position (first circle 93) detected by the detecting unit 15 is detected. Accordingly, re-matching is quickly performed (inconsistency of the matching is solved in a short time) and the re-route setting can be performed, and the automatic driving can be resumed in a short time.

Figure 9:
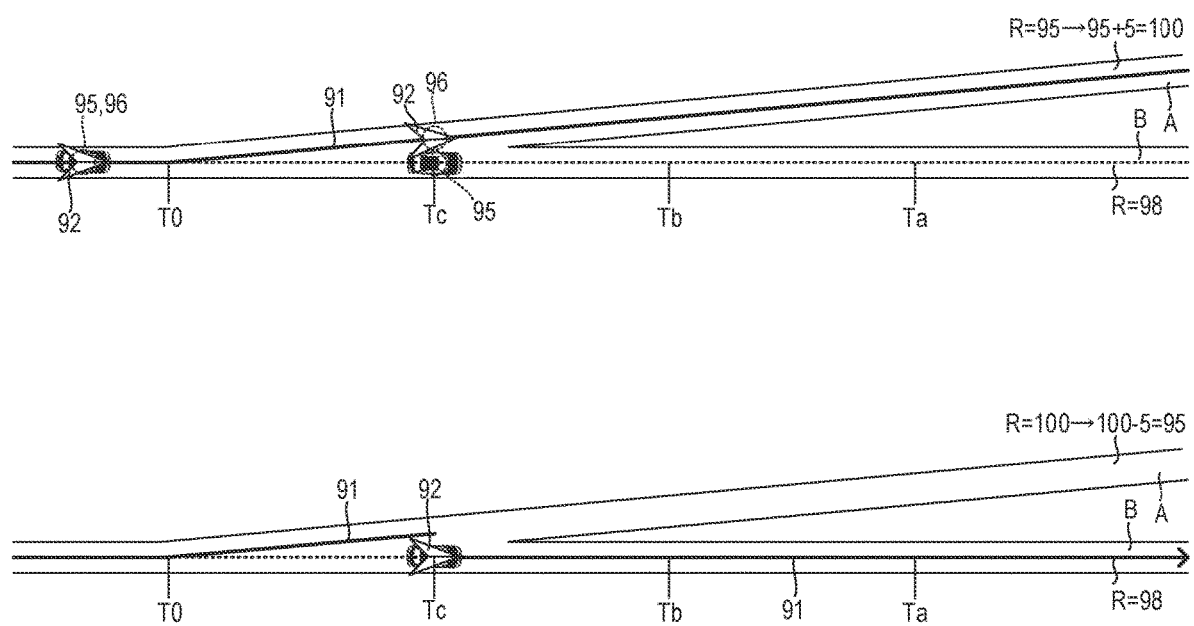
FIG. 9 is a drawing illustrating a case where the navigation device of this embodiment matches the position of own vehicle on the map and own vehicle travels without following the guidance route (second).

FIG. 9 is a drawing illustrating a case where the navigation device 10 of this embodiment matches the position of own vehicle on the map and own vehicle travels without following the guidance route 91 (second).

FIG. 9 is a drawing in a case where the locator 101 matches the position of own vehicle as the first own position using the HD map 114. At this time, it is assumed that, in FIG. 2, the HD map 114 is coupled to the locator 101 instead of the SD map 102 and the image data output from the camera 13 is output to the locator 101. This allows the locator 101 to match the position of own vehicle as the first own position on the HD map 114 so as to identify not only the traveling route where own vehicle travels but also the driving lane in the traveling route. Accordingly, the first own position based on the HD map 114 provides position accuracy (position resolution) higher than that of the first own position based on the SD map 102.

Accordingly, as illustrated in the upper drawing in FIG. 9, the first own position based on the HD map 114 is represented by a fourth circle 96. The fourth circle 96 can be represented as a circle having a diameter smaller than that of the second circle 94 (FIG. 8) indicative of the first own position based on the SD map 102 and a circle having the diameter, for example, same as that of the third circle 95.

In this case, a time (Tc−T0) until the fourth circle 96 is separated from the third circle 95 without overlapping with one another is shorter than a time (Tb−T0) until the second circle 94 (FIG. 8) is separated from the third circle 95 (FIG. 8) without overlapping with one another and a time (Ta−T0) until the second circle 94 (FIG. 7) is separated from the first circle 93 (FIG. 7) without overlapping with one another. Accordingly, as illustrated in the lower drawing in FIG. 9, when the locator 101 matches the position of own vehicle as the first own position using the HD map 114, the inconsistency of the matching can be solved in a further short time and the re-route setting can be performed, and the automatic driving can be resumed in a further short time.

Effects of this Embodiment

The navigation device 10 includes: the own vehicle position detecting means (detecting unit 15) configured to detect the position information of own vehicle; the route setting means (calculating unit 105) configured to set the guidance route 91 that guides own vehicle to the destination on the basis of the first map (SD map 102) including the information of the traveling route and the position information of own vehicle; the matching means (locator 101) configured to match the position of own vehicle as the first own position with the traveling route where own vehicle travels on the first map (SD map 102) on the basis of the position information of own vehicle; the driving lane detecting means (locator 111) configured to match the position of own vehicle as the second own position with the driving lane where own vehicle travels on the second map (HD map 114) on the basis of the second map (HD map 114) including the information of the driving lane in the traveling route and the position information of own vehicle; and the determining means (determining unit 122) configured to determine whether the second own position is included in the first own position. When the guidance route 91 is set, the matching means (locator 101) matches the first own position on the guidance route 91. When the second own position is no longer included in the first own position thereafter, the matching means (locator 101) matches the first own position on the first map (SD map 102) on the basis of the position information.

With the configuration, whether the second own position matched on the second map (HD map 114), which has the accuracy higher than (the resolution higher than) that of the first map (SD map 102) is included in the first own position matched on the first map (SD map 102) is detected. This allows quick detection compared with the case where the first own position matched on the first map (SD map 102) is included in the current own vehicle position detected by the detecting unit 15 is detected, thereby providing the navigation device 10 configured to perform quick re-matching (inconsistency of the matching is solved in a short time).

In this embodiment, the second map has the resolution higher than the resolution of the first map. Thus, whether the second own position matched on the second map having the resolution higher than that of the first map is included in the first own position matched on the first map (guidance route) is determined. This allows performing quick re-matching (inconsistency of the matching is solved in a short time) compared with the case where, for example, the second own position matched on the first map is included in the first own position matched on the first map (guidance route) is determined.

In this embodiment, the first map does not include the information of the driving lane with which the position of own vehicle is matched, and the second map includes the information of the driving lane with which the position of own vehicle is matched. Thus, the information of the driving lane is omitted in the first map to ensure reduction in information volume of the first map, thereby ensuring quick reading of the first map. The second map includes the information of the driving lane and therefore is high-resolution information. However, only a part of the information including the second own position is used, thereby ensuring reducing a load to the navigation device 10.

In this embodiment, the reliability calculating means (calculating unit 105) configured to calculate the matching reliability as the value indicative of the probability that own vehicle travels the traveling route for at least one of the traveling routes on the basis of the position information of own vehicle and the information of the traveling route is provided. The matching means (locator 101) matches the first own position with the traveling route on the basis of the matching reliability.

With the configuration, the matching means (locator 101) can easily match the first own position with the traveling route on the first map (SD map 102) from the point when own vehicle enters one traveling route from the branch point.

In this embodiment, the matching means (locator 101) matches the first own position with the traveling route with the highest matching reliability. The configuration allows simplifying the operation for matching.

In this embodiment, when the guidance route 91 is set, the reliability calculating means (calculating unit 105) sets the matching reliability regarding the guidance route 91 to a higher value compared with the case where the guidance route 91 is not set.

In the configuration, the matching reliability of the traveling route (traveling route A) on the guidance route 91 after setting the guidance route 91 can be set to be higher than at least the matching reliability of the traveling route (traveling route B) branched from the traveling route (traveling route A). At this time, the matching means (locator 101) can compare the matching reliability of the guidance route 91 (traveling route A) with the matching reliability of the traveling route (traveling route B) branched from the guidance route 91 (traveling route A), select the traveling route (traveling route A) on the guidance route 91 with the higher matching reliability, and reliably match the first own position on the SD map 102. Furthermore, the matching reliability of the traveling route (traveling route A) on the guidance route 91 after setting the guidance route 91 can be set to 100% or more. At this time, the matching means (locator 101) can reliably and quickly match the first own position with the traveling route (traveling route A) on the guidance route 91 on the first map (SD map 102) with no condition, that is, without a comparison with the matching reliability of the traveling route (traveling route B) branched from the traveling route.

In this embodiment, when the guidance route 91 is set and the second own position is no longer included in the first own position thereafter, the reliability calculating means (calculating unit 105) sets the matching reliability regarding the guidance route 91 to the matching reliability before the setting of the guidance route 91 and the matching means (locator 101) matches the first own position with the traveling route with the highest matching reliability among the traveling routes.

With the configuration, the matching means (locator 101) can reliably match the first own position with the traveling route on the first map (SD map 102) on the basis of the traveling route where own vehicle actually travels.

In this embodiment, when the guidance route 91 is set, the reliability calculating means (calculating unit 105) adds the predetermined value to the matching reliability regarding the guidance route 91.

In the configuration, the predetermined value can be any value such that the matching reliability of the traveling route (traveling route A) on the guidance route 91 becomes higher than at least the matching reliability of the traveling route (traveling route B) branched from the traveling route (traveling route A). At this time, the matching means (locator 101) can compare the matching reliability of the guidance route 91 (traveling route A) with the matching reliability of the traveling route (traveling route B) branched from the guidance route 91 (traveling route A), select the traveling route (traveling route A) on the guidance route 91 with the higher matching reliability, and reliably match the first own position on the SD map 102. Furthermore, the predetermined value can be any value with which the matching reliability of the traveling route (traveling route A) on the guidance route 91 becomes 100% or more. This allows the matching means (locator 101) to reliably and quickly match the first own position with the traveling route (traveling route A) on the guidance route 91 on the first map (SD map 102) with no condition, that is, without a comparison with the matching reliability of the traveling route (traveling route B) branched from the traveling route.

In this embodiment, when the guidance route 91 is set and the second own position is no longer included in the first own position thereafter, the reliability calculating means (calculating unit 105) subtracts the predetermined value added to the matching reliability regarding the guidance route 91, and after the predetermined value is subtracted, the matching means (locator 101) matches the first own position with the traveling route with the highest matching reliability among the traveling routes.

With the configuration, the matching means (locator 101) can reliably match the first own position with the traveling route on the first map (SD map 102) on the basis of the traveling route where own vehicle actually travels.

In this embodiment, when the guidance route 91 is set and the second own position is no longer included in the first own position thereafter, the route setting means (calculating unit 105) updates the guidance route 91.

With this configuration, the position of own vehicle can be matched with the guidance route 91 after update as the first own position and the mark 92 indicative of the first own position can be displayed on the guidance route 91 after update.

The automatic driving control device 12 of this embodiment is the automatic driving control device 12 to which the navigation device 10 is coupled to allow the automatic driving on own vehicle. The automatic driving control device 12 is allowed to perform the automatic driving when the guidance route 91 is set and the second own position is included in the first own position.

With the configuration, when the automatic driving is canceled by the drive operation by the driver, since the navigation device 10 quickly performs the re-route setting, the automatic driving control can be resumed in a short time. Especially, by adding the predetermined value to the matching reliability regarding the traveling route on the guidance route 91 and setting the matching reliability to 100 or more, the position of own vehicle can be reliably matched with the traveling route where own vehicle actually travels, and the automatic driving can be continuously performed after passing of the branch point.

The navigation method of this embodiment includes: the own vehicle position detecting step of detecting the position information of own vehicle; the route setting step of setting the guidance route 91 that guides own vehicle to the destination on the basis of the first map (SD map 102) including the information of the traveling route and the position information of own vehicle; the matching step of matching the position of own vehicle as the first own position with the traveling route where own vehicle travels on the first map (SD map 102) on the basis of the position information of own vehicle; the driving lane detecting step of matching the position of own vehicle as the second own position with the driving lane where own vehicle travels on the second map (HD map 114) on the basis of the second map (HD map 114) including the information of the driving lane in the traveling route and the position information of own vehicle; and the determining step of determining whether the second own position is included in the first own position. When the guidance route 91 is set, the matching step matches the first own position on the guidance route 91. When the second own position is not included in the first own position thereafter, the matching step matches the first own position on the first map (SD map 102) on the basis of the position information.

With the method, whether the second own position matched on the second map (HD map 114), which has the accuracy higher than (the resolution higher than) that of the first map (SD map 102), is included in the first own position matched on the first map (SD map 102) is detected. This allows performing quick detection compared with the case where whether the first own position matched on the first map (SD map 102) is included in the current own vehicle position detected by the detecting unit 15 is detected, and therefore the quick re-matching can be performed (inconsistency of the matching is solved in a short time).

The embodiments have been described above, and the embodiments allow operating the navigation device 10 without performing the automatic driving. In a case where the guidance route 91 is set and traveling to the same destination is repeated, the record can be reflected to the navigation device 10. At this time, the traveling route on the guidance route 91 is calculated such that the matching reliability becomes higher than that of the traveling route branched from the traveling route. Thus, when own vehicle comes from and goes to the destination again and again, the calculation of the matching reliability may be omitted.

The invention claimed is:

1. A navigation device comprising:
   own vehicle position detecting means configured to detect position information of own vehicle;
   a first map including information of traveling routes and a second map including information of driving lanes in the traveling routes;
   matching means configured to match a detected position of the own vehicle with a position, referred to as a first own position, on the traveling route where the own vehicle travels on the first map on the basis of the first map and the position information of the own vehicle, the first own position being a predetermined region around the center of the traveling route on which the own vehicle travels, the predetermined region having a dimension dependent on the resolution of the first map;
   route setting means configured to set a guidance route that guides the own vehicle from its current detected position to a destination on the basis of the first map and the position information of the own vehicle;
   driving lane detecting means configured to match the current detected position of the own vehicle with a position, referred to as second own position, on a driving lane where the own vehicle travels on the second map on the basis of the second map and the position information of the own vehicle, the second own position being a predetermined region around the center of the driving lane on which the own vehicle travels, the predetermined region having a dimension dependent on the resolution of the second map;
   determining means configured to determine whether the second own position is included in the first own position; and
   an automatic driving control device configured to perform automatic driving on the own vehicle,
   wherein when the guidance route is set and the matching means matches the first own position on the guidance route, and when the second own position is no longer included in the first own position thereafter, the matching means re-matches the first own position on the first map on the basis of the position information and the route setting means updates the guidance route, and
   wherein the automatic driving control device is able to perform automatic driving on the own vehicle when the guidance route is set and the second own position is included in the first own position.

2. The navigation device according to claim 1, wherein the second map has a resolution higher than a resolution of the first map.

3. The navigation device according to claim 1, wherein the first map does not include the information of the driving lane with which the position of the own vehicle is matched, and the second map includes the information of the driving lane with which the position of the own vehicle is matched.

4. The navigation device according to claim 1, comprising reliability calculating means configured to calculate a matching reliability as a value indicative of probability that the own vehicle travels the traveling route for at least one of the traveling routes on the basis of the position information of the own vehicle and the information of the traveling route, wherein the matching means matches the first own position with the traveling route on the basis of the matching reliability.

5. The navigation device according to claim 4, wherein the matching means matches the first own position with the traveling route with the highest matching reliability.

6. The navigation device according to claim 4, wherein when the guidance route is set, the reliability calculating means sets the matching reliability regarding the guidance route to a higher value compared with a case where the guidance route is not set.

7. The navigation device according to claim 6, wherein when the guidance route is set and the second own position is no longer included in the first own position thereafter, the reliability calculating means sets the matching reliability regarding the guidance route to the matching reliability before the setting of the guidance route, and the matching means matches the first own position with the traveling route with the highest matching reliability among the traveling routes.

8. The navigation device according to claim 4, wherein when the guidance route is set, the reliability calculating means adds a predetermined value to the matching reliability regarding the guidance route.

9. The navigation device according to claim 8, wherein when the guidance route is set and the second own position is no longer included in the first own position thereafter, the reliability calculating means subtracts the predetermined value added to the matching reliability regarding the guidance route, and after the predetermined value is subtracted, the matching means matches the first own position with the traveling route with the highest matching reliability among the traveling routes.

10. The navigation device according to claim 1, wherein when the guidance route is set and the second own position is no longer included in the first own position thereafter, the route setting means updates the guidance route.

11. A navigation method using a first map comprising information of traveling routes and a second map comprising information of driving lanes in the traveling routes, the method comprising:
    an own vehicle position detecting step of detecting position information of own vehicle;
    a matching step of matching a detected position of the own vehicle with a position, referred to as a first own position, on the traveling route when the own vehicle travels on the first map on the basis of the first map and the position information of the own vehicle,
    the first own position being a predetermined region around the center of the traveling route on which the own vehicle travels, the predetermined region having a dimension dependent on the resolution of the first map;
    a route setting step of setting a guidance route that guides the own vehicle from its current detected position to a destination on the basis of the first map and the position information of the own vehicle;
    a driving lane detecting step of matching the current detected position of the own vehicle with a position, referred to as a second own position, on a driving lane where the own vehicle travels on the second map on the basis of the second map and the position information of the own vehicle, the second own position being a predetermined region around the center of the driving lane on which the own vehicle travels the predetermined region having a dimension dependent on the resolution of the second map;

a determining step of determining whether the second own position is included in the first own position; and an automatic driving controlling step of performing automatic driving on the own vehicle, wherein when the guidance route is set and the matching step matches the first own position on the guidance route, and when the second own position is no longer included in the first own position thereafter, the matching step re-matches the first own position on the first map on the basis of the position information and the route setting step updates the guidance route, and wherein the automatic driving controlling step can be performed when the guidance route is set and the second own position is included in the first own position.

12. The navigation device according to claim 1, wherein when the own vehicle enters a route that is not the traveling route on the guidance route, automatic driving is cancelled.

13. The navigation method according to claim 11, further comprising cancelling automatic driving when the own vehicle enters a route that is not the traveling route on the guidance route.

* * * * *